United States Patent
Namiki et al.

(10) Patent No.: US 12,296,486 B2
(45) Date of Patent: May 13, 2025

(54) PROGRAM EDITING DEVICE

(71) Applicant: Fanuc Corporation, Yamanashi (JP)

(72) Inventors: Yuta Namiki, Yamanashi (JP); Shoutarou Ogura, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 207 days.

(21) Appl. No.: 17/919,637

(22) PCT Filed: Apr. 14, 2021

(86) PCT No.: PCT/JP2021/015481
§ 371 (c)(1),
(2) Date: Oct. 18, 2022

(87) PCT Pub. No.: WO2021/215333
PCT Pub. Date: Oct. 28, 2021

(65) Prior Publication Data
US 2023/0182292 A1    Jun. 15, 2023

(30) Foreign Application Priority Data

Apr. 20, 2020 (JP) ................................. 2020-074943

(51) Int. Cl.
*B25J 9/16*    (2006.01)

(52) U.S. Cl.
CPC ........... *B25J 9/1656* (2013.01); *B25J 9/1697* (2013.01)

(58) Field of Classification Search
CPC .................. G06F 3/0484; B25J 9/1661; G05B 2219/40095; G05B 2219/40099; G05B 19/409
See application file for complete search history.

(56) References Cited

U.S. PATENT DOCUMENTS 9,612,727 B2    4/2017    Saito et al.
2014/0298231 A1*    10/2014    Saito ..................... G06F 3/0484
                                                                            715/771
(Continued)

FOREIGN PATENT DOCUMENTS

CN    103862472 A    6/2014
CN    105408823 A    3/2016
(Continued)

OTHER PUBLICATIONS

Rainer Bischoff, Arif Kazi, Markus Seyfarth, The MORPHA Style Guide for Icon-Based Programming, Sep. 25, 2002, IEEE Int. Workshop on Robot and Human Interactive Communication, p. 482-487 (Year: 2002).*

(Continued)

*Primary Examiner* — Khoi H Tran
*Assistant Examiner* — Dairon Estevez
(74) *Attorney, Agent, or Firm* — Buchanan Ingersoll & Rooney PC (57) ABSTRACT

The present invention makes it possible to create a vision detection program without a sense of incongruity, even for an operator who is used to robot programming but not used to vision detection programming. Provided is a program editing device for editing a motion program for a robot, the program editing device including: a program editing unit which receives common input operations with respect to a first type of icon that corresponds to commands relating to control of the robot and a second type of icon that corresponds to commands relating to image capture by a visual sensor and to processing of captured images; and a program generation unit which generates the motion program in accordance with the first type of icon and second type of icon subjected to editing.

8 Claims, 8 Drawing Sheets

(56) References Cited

U.S. PATENT DOCUMENTS

| | | | | |
|---|---|---|---|---|
| 2017/0236446 A1* | 8/2017 | Gupta | ................ | G09B 19/0053 |
| | | | | 434/118 |
| 2019/0143524 A1* | 5/2019 | Takahashi | .............. | B25J 9/1682 |
| | | | | 700/264 |
| 2021/0110735 A1* | 4/2021 | Nagasaka | .......... | G09B 19/0053 |

FOREIGN PATENT DOCUMENTS

| | | | | | |
|---|---|---|---|---|---|
| CN | 109760042 | A | | 5/2019 | |
| CN | 110315533 | A | | 10/2019 | |
| DE | 102012004983 | A1 | * | 9/2013 | ............ B25J 9/1671 |
| JP | 08249026 | A | | 9/1996 | |
| JP | H09258971 | A | * | 10/1997 | |
| JP | 2001088068 | A | | 4/2001 | |
| JP | 2010-134879 | A | | 6/2010 | |
| JP | 2014210332 | A | | 11/2014 | |
| JP | 2017054298 | A | | 3/2017 | |
| JP | 2018-077692 | A | | 5/2018 | |
| JP | 6498366 | B1 | | 4/2019 | |
| WO | WO-2019112110 | A1 | * | 6/2019 | .............. B25J 19/02 |

OTHER PUBLICATIONS

International Search Report and Written Opinion for International Application No. PCT/JP2021/015481, dated May 25, 2021, 6 pages.

\* cited by examiner

PROGRAM EDITING DEVICE

CROSS REFERENCE TO RELATED APPLICATIONS

This is the U.S. National Phase application of PCT/JP2021/015481, filed Apr. 14, 2021, which claims priority to Japanese Patent Application No. 2020-074943, filed Apr. 20, 2020, the disclosures of these applications being incorporated herein by reference in their entirety for all purposes.

FIELD OF THE INVENTION

The present invention relates to a program editing device.

BACKGROUND OF THE INVENTION

Since robot programming is generally performed using text-based command statements, it is necessary that the operator be knowledgeable in the programming language of the robot. In order to support intuitive input by the operator of the robot control program, program creation devices which enable programming using icons representing the commands of robot control have been proposed (For example, Patent Literature 1 and Patent Literature 2).

PATENT LITERATURE

[PTL 1] Japanese Unexamined Patent Publication (Kokai) No. 8-249026
[PTL 2] Japanese Patent No. 6498366

SUMMARY OF THE INVENTION

Motion programs for performing operations such as handling of workpieces in a robot system comprising a visual sensor include a program for so-called vision detection in which the position of an object is detected from an image captured by a visual sensor, which is then provided to a robot controller. The program for vision detection includes commands for image capture with a camera and commands for detecting an object, and the creation method thereof is different from robot control programs. Thus, even an operator who is accustomed to the programming of robot control programs cannot use such knowledge to create a vision detection program. A program editing device which enables even an operator who is accustomed to programming robots but not accustomed to programming vision detection to create a vision detection program without difficulty is desired.

An aspect of the present disclosure provides a program editing device for editing a motion program of a robot, comprising a program editing unit for receiving a shared editing operation on a first type of icons corresponding to commands related to control of the robot and a second type of icons corresponding to commands related to imaging with a visual sensor and processing of captured images, and a program generation unit for generating the motion program in accordance with the edited first type of icons and second type of icons.

According to the configuration described above, even an operator who is accustomed to robot programming but not accustomed to programming vision detection can create a vision detection program without difficulty.

The object, characteristics, and advantages of the present invention as well as other objects, characteristics, and advantages will be further clarified from the detailed description of typical embodiments of the present invention shown in the attached drawings.

DETAILED DESCRIPTION OF EMBODIMENTS OF THE INVENTION

Next, the embodiments of the present disclosure will be described with reference to the drawings. In the referenced drawings, identical constituent portions or functional portions are assigned the same reference signs. In order to facilitate understanding, the scales of the drawings have been appropriately modified. Furthermore, the forms shown in the drawings are merely examples for carrying out the present invention. The present invention is not limited to the illustrated forms.

Figure 1:
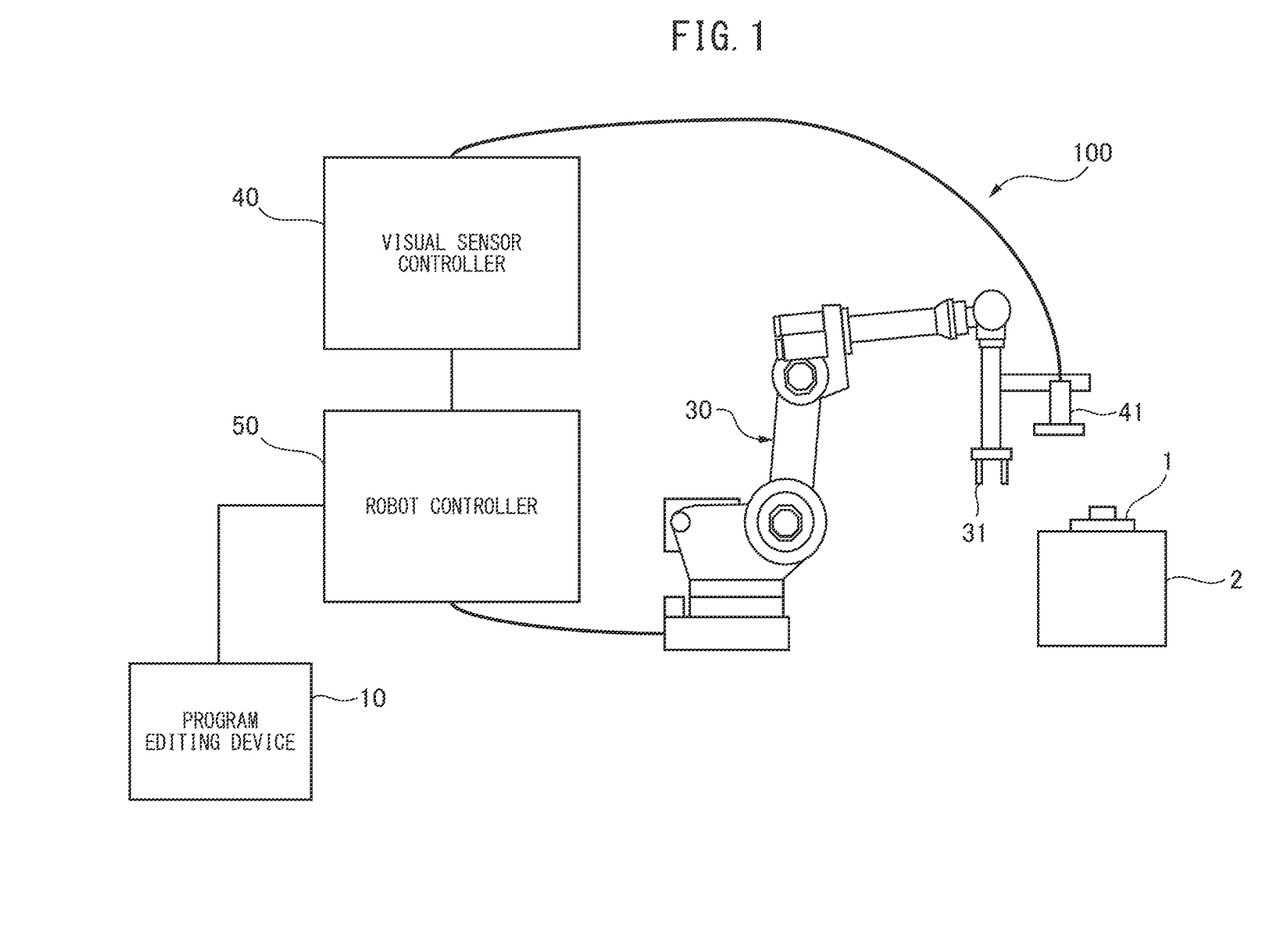
FIG. 1 is a view showing a configuration example of a robot system comprising a program editing device according to an embodiment.

FIG. 1 is a view showing an example of the configuration of a robot system 100 comprising a program editing device 10 according to an embodiment. The robot system 100 comprises a robot 30 in which a hand 31 is equipped on the tip of an arm, a robot controller 50 for controlling the robot 30, the program editing device 10 which is connected to the robot controller 50, a visual sensor 41 attached to the tip of the arm of the robot 30, and a visual sensor controller 40 for controlling the visual sensor 41. In the robot system 100, an object 1 on a workbench 2 is handled by the hand 31 of the robot 30 controlled by the robot controller 50.

The visual sensor controller 40 has a function for controlling the visual sensor 41 and a function for performing image processing on the images captured by the visual sensor 41. The visual sensor controller 40 detects the position of the object 1 from the image captured by the visual sensor 41, and supplies the detected position of the object 1 to the robot controller 50. As a result, the robot controller 50 can execute correction of the teaching positions, extraction of the object 1, etc. Below, the function of detecting the position of the object from the image captured by the visual sensor may be referred to as vision detection, and the function of correcting the teaching position based on the position detection by the visual sensor may be referred to as vision correction. Though FIG. 1 shows an example in which the visual sensor 41 is attached to the tip of the arm of the robot 30, the visual sensor 41 may be affixed in the work space at a position where the object 1 can be photographed on the workbench 2.

The visual sensor 41 may be a camera which captures grayscale images or color images, or a stereo camera or a three-dimensional sensor which can capture distance images or three-dimensional point groups. A plurality of visual sensors may be arranged in the robot system 100. The visual sensor controller 40 retains model patterns of objects, and executes image processing for detecting an object by pattern matching between an image of an object in the captured image and a model pattern.

The program editing device 10 is used to create a motion program for the robot 30 for executing handling of the object 1. The program editing device 10 is, for example, a teaching device (teach pendant, tablet terminal, etc.) connected to the robot controller 50. The program editing device 10 may have a configuration as a general computer having a CPU, ROM, RAM, a storage device, an input/output interface, a network interface, etc. The program editing device 10 may be a so-called "programming device" (PC or the like) for performing programming offline.

As will be described in detail below, the program editing device 10 can be used for programming by means of icons related to both commands used in control of the robot 30 and commands related to imaging with the visual sensor and processing (vision detection) of captured images. Below, when icons of commands used in control of the robot 30 and icons representing commands used in vision detection are distinguished, the former are referred to as the first type of icons and the latter are referred to as the second type of icons.

Figure 2:
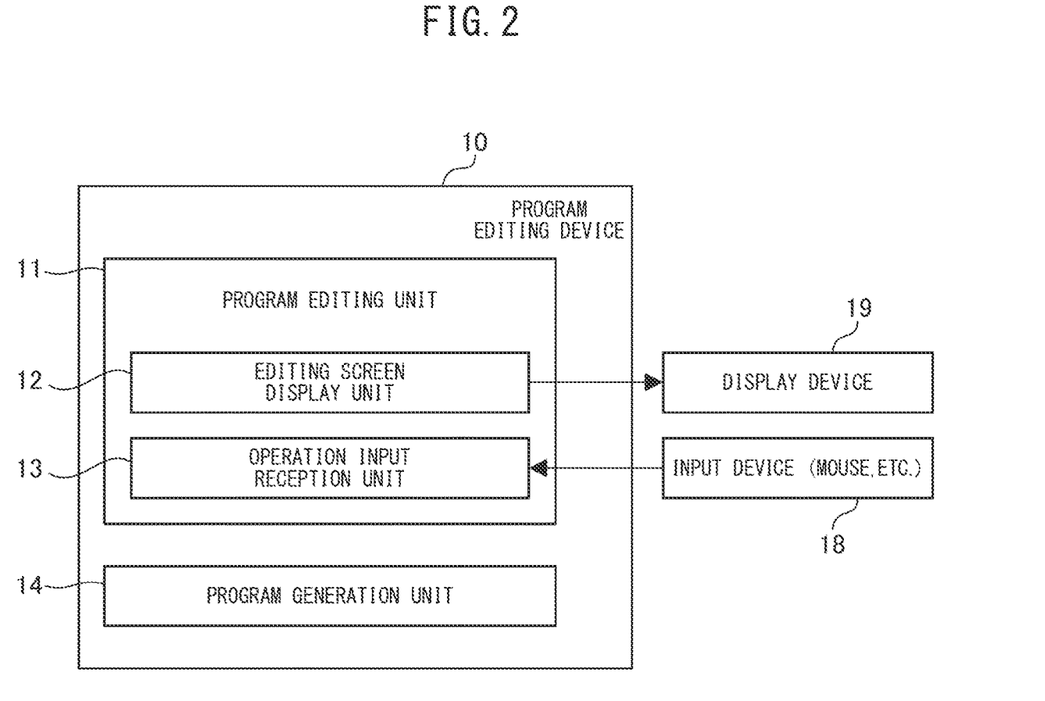
FIG. 2 is a function block diagram of the program editing device.

FIG. 2 is a functional block diagram of the program editing device 10. The program editing device 10 comprises a program editing unit 11 for performing program editing using icons, a program generation unit 14 for generating a motion program based on the edited icons, a display device 19 for displaying an editing screen, and an input device 18 including a keyboard, mouse, etc. The program editing unit 11 has an editing screen display unit 12 and an operation input reception unit 13. The editing screen display unit 12 displays, on the display device 19, an editing screen 400 refer to FIG. 3) which is the screen for editing the motion program of the robot 30 and which includes an icon display area 200 in which an icon list including the first type icons related to control of the robot and the second type icons related to the vision detection function are displayed, and a program creation area 300 for performing programming by arranging one or more icons selected from the icon display area 200 in the order of operation. The operation input reception unit 13 receives operation input for selecting icons from the list displayed in the icon display area 200 and arranging them in the program creation area 300. The program generation unit 14 generates a motion program from the one or more icons arranged in the operation order in the program creation area 300.

The functional blocks of the program editing device 10 shown in FIG. 2 may be realized by the CPU of the program editing device 10 executing various software stored in the storage device, or alternatively, may be realized by a hardware-based configuration such as an ASIC (Application Specific IC).

Figure 3:
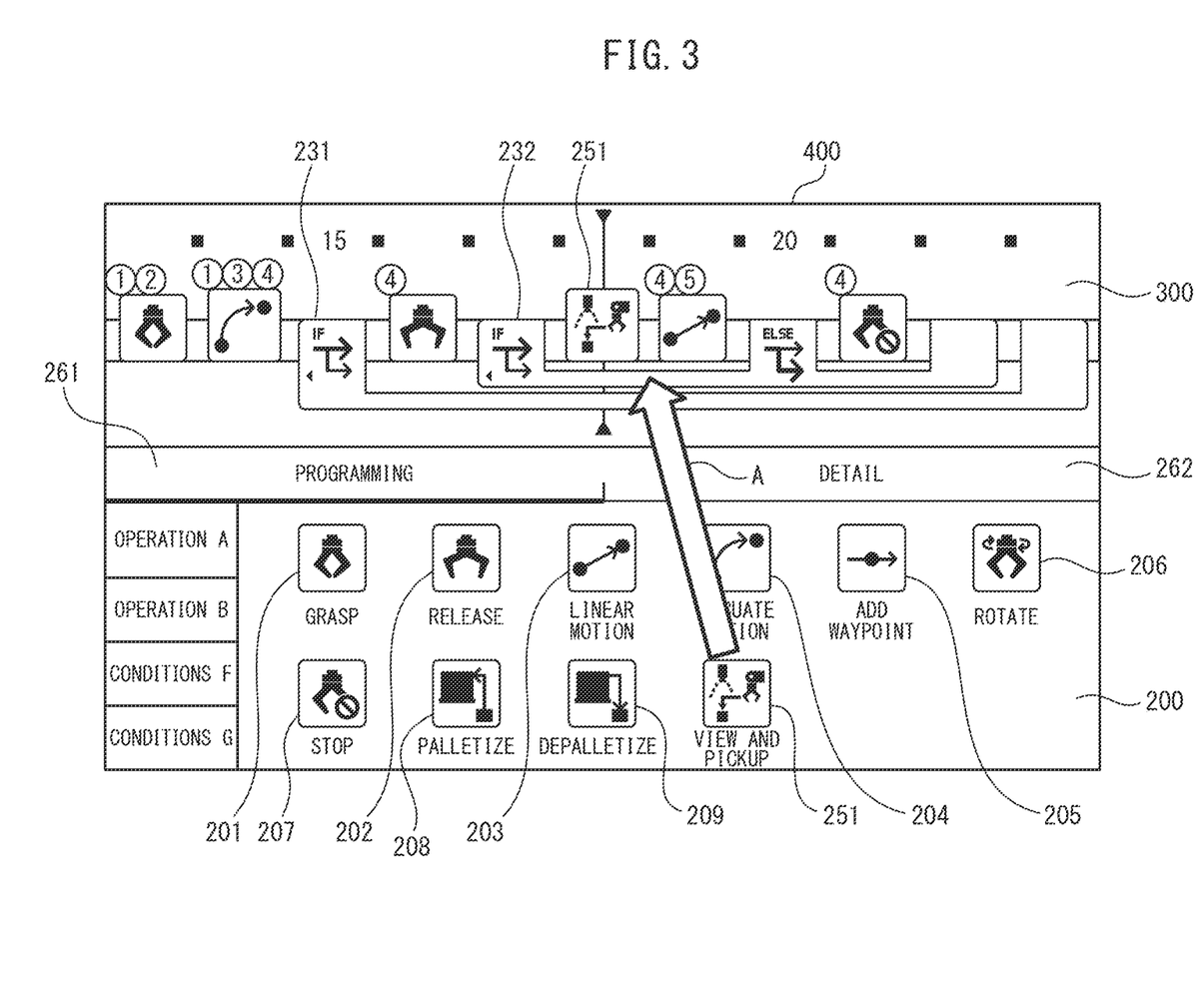
FIG. 3 is a view showing an example of an editing screen for editing a program.

FIG. 3 is an example of the editing screen 400. As shown in FIG. 3, the editing screen 400 has the icon display area 200 in which a list of icons are displayed, and the program creation area (first program creation area) 300 for arranging the icons displayed in the icon display area (first icon display area) 200 in the order of operation. The operator creates a motion program by arranging the icons selected from the icon display area 200 in the program creation area 300 in the order of operation.

The editing operation will be described using the case where a mouse is used as the input device for editing the motion program as an example. In the editing screen 400 shown in FIG. 3, the icon display area 200 displays a list of icons which can be used for performing programming. In the example of FIG. 3, the icons listed in the icon display area 200 include various icons 201 to 209 (first type of icons) for robot control (robot program) and icon 251 (second type of icons) for vision detection. Each icon displayed in the icon display area 200 is represented by a graphic the function of which can intuitively be understood by the operator. Furthermore, at the bottom of each icon, words (function name, etc.) representing the function thereof are expressed in characters to facilitate understanding of the function.

In the editing screen 400 of FIG. 3, by selecting the programming tab 261 arranged in the center of the screen, the area at the bottom of the screen becomes the icon display area 200 for displaying the programming icons. The icons 201 to 209 for robot control exemplified in FIG. 3 correspond to the following commands.

Icon 201: command to close hand and grasp object
Icon 202: command to open hand
Icon 203: command to move tip of robot arm in straight line trajectory
Icon 204: command to move tip of robot arm in arcuate trajectory
Icon 205: command to add a waypoint to the route
Icon 206: command to rotate hand
Icon 207: command to stop hand
Icon 208: palletizing (loading) execution command
Icon 209: de-palletizing (unloading) execution command The upper program creation area 300 in the editing screen 400 is an area for creating a motion program by arranging icons in the order of operation. In the editing screen 400, icons are dragged and dropped from the icon display area 200 to the program creation area 300 by operating a mouse. The operation input reception unit 13 arranges a copy of the selected icon in the program creation area in response to such a drag-and-drop operation. By such an operation, the operator can create a motion program by selecting icons from the icon display area 200 and arranging them in the desired positions in the program creation area. In the program creation area 300, the icons selected from the icon display area 200 are arranged from left to right in the order of operation.

When an icon arranged in the program creation area 300 is selected and a detail tab 262 is selected, the lower area of the editing screen 400 becomes a parameter setting screen (not illustrated) for setting the detailed operation of the command of the icon. The operator can set detailed parameters related to the operation command of the selected icon via the parameter setting screen. As an example, when the icon 203 (straight line movement) arranged in the program creation area 300 is selected, the icon 203 is highlighted. If the operator selects the detail tab 262 in this state, the setting screen for the command (straight line movement) of the icon 203 is displayed in the lower area of the editing screen 400. In this case, the contents of the detailed settings include the following setting items (target position/posture and moving speed). The operator inputs, for example, the following numerical data in each setting item.

(Parameter Setting Items)
   Target position/posture: X: 345.6, Y: 456.7, Z: 567.8
      W: 345.6, P: 456.7, R: 567.8
   Target speed: 750 mm/sec In the example of FIG. 3, the icon 251 related to vision detection is included in the icon display area 200. The icon 251 provides a function to call a vision detection program. The icon 251 is represented by a graphic with which the operation of detecting an object with a visual sensor, and picking up the object can intuitively be understood. Furthermore, on the lower side of the icon 251 is displayed the phrase "view and pick up", which simply expresses the function of the icon 251. The concave frame-shaped icons 231 and 232 included in the program creation area 300 are icons referred to as "auxiliary icons", and are used as icons for defining branch commands and repetitive operations. Such auxiliary icons can be displayed in the icon display area 200.

When the operator selects the "view and pick up" icon 251 and incorporates it into the motion program, the robot control icons 201 to 209 can be arranged in the program creation area 300 by the same operation as the case in which they are arranged in the program creation area 300 by dragging and dropping. FIG. 3 shows a state in which the icon 251 is incorporated into the motion program of the program creation area 300 by a drag-and-drop operation by the operator from the icon display area 200 (arrow A).

Figure 4:
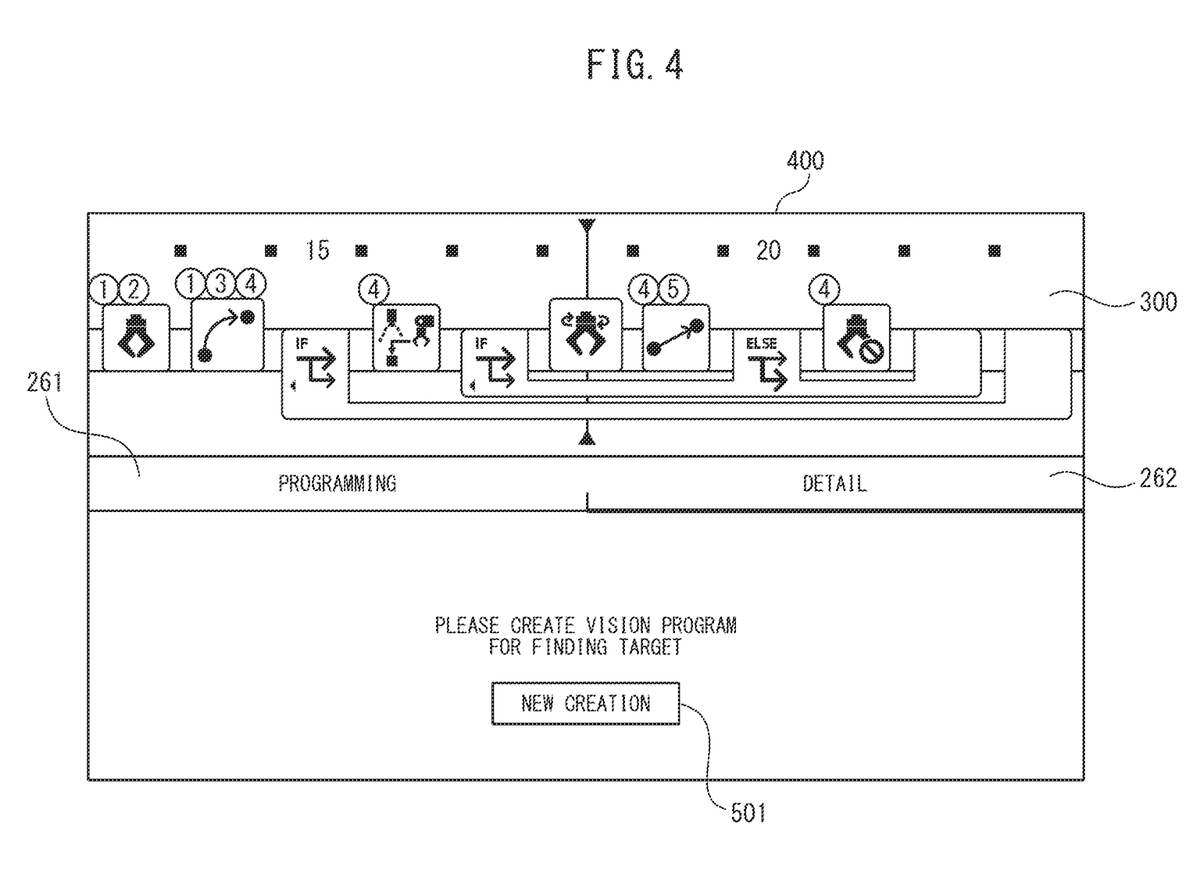
FIG. 4 is an example of a screen when a vision detection program is newly created.

When the detail tab 262 is selected in a state in which the icon 251 arranged in the program creation area 300 in FIG. 3 is selected, if a vision detection program is to be newly created, as shown in FIG. 4, a screen including button 501 for designating a new creation is displayed in the lower area of the editing screen 400. When the operator selects the new creation button 501, another screen for creating a visual program appears (FIG. 6).

Figure 5:
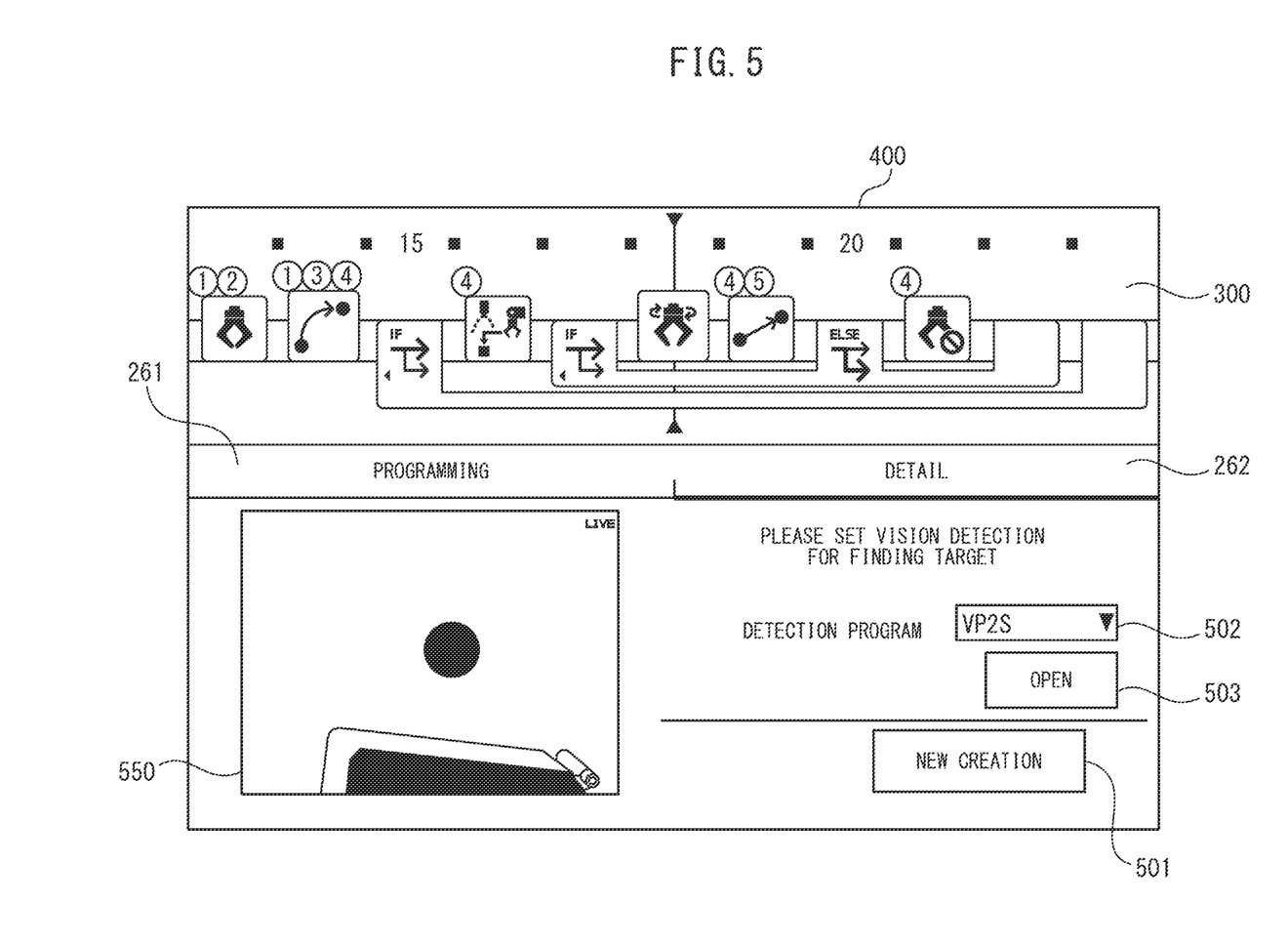
FIG. 5 is an example of a screen when a vision detection program is selected from a drop-down menu.

If a vision detection program has already been registered in the program editing device 10, when the detail tab 262 is selected in a state in which the icon 251 is selected on the editing screen 400 of FIG. 3, a drop-down menu 502 appears in addition to the new creation button 501 as shown in FIG. 5. The operator can open the selected vision detection program by selecting the desired vision detection program from the drop-down menu 502 and pressing the open button 503. A live image 550 from the visual sensor 41 may be displayed in the lower area of the editing screen 400 of FIG. 5

Figure 6:
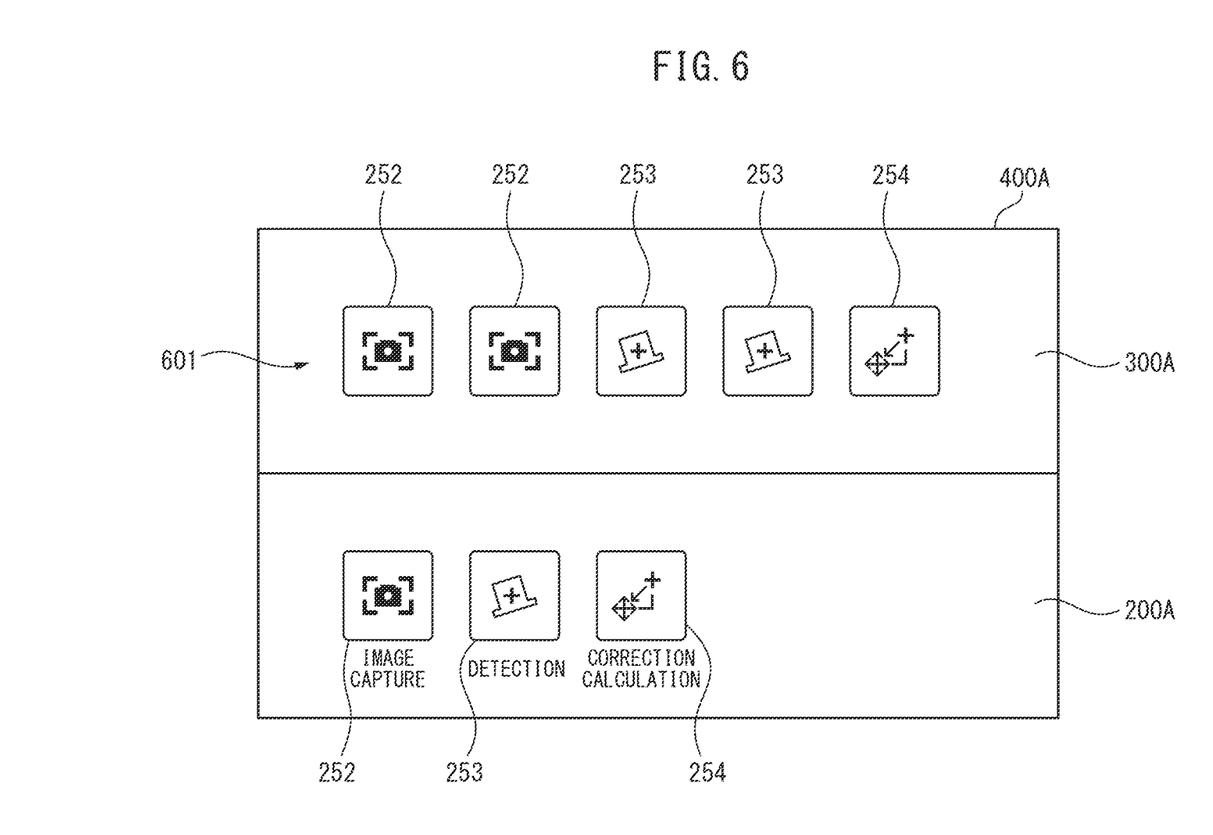
FIG. 6 is an example of another screen for creating a vision detection program.

FIG. 6 shows an example of a vision detection program editing screen 400A, which is a separate screen to be displayed by selecting the new creation button 501 or selecting the vision detection program from the drop-down menu 502 and selecting the open button 503. Command icons 252 to 254 which can be used to create a vision detection program are listed in the icon display area (second icon display area) 200A in the lower half of the editing screen 400A. In the program creation area (second program creation area) 300A in the upper half of the editing screen 400A, the icons of the vision detection programs are arranged in the order of operation. The operator creates a vision program by dragging and dropping a desired icon from the icons listed in the icon display area 200A and arranging the desired icon in the program creation area 300A. In this manner, even when creating/editing a vision detection program on a separate screen, a vision detection program can be created on the editing screen having the same screen configuration as when creating the robot control program shown in FIG. 3 and by the same selection operation.

As an example, in the program creation area 300A of the editing screen 400A in FIG. 6, a vision detection program 601 is created in which two image capture icons 252 for instructing imaging, two detection icons 253 for instructing detection of an object, and a correction calculation icon 254 are arranged side by side. The vision detection program using icons in this case corresponds to the following command contents in order from the left in the drawing.
   SNAP1: capture image 1
   SNAP2: capture image 2
   FIND_SHAPE: find contours from images
   FIND_BLOB: find blob from images
   CALC_OFFSET: calculate offset value In this case, the operator selects each icon arranged in the program creation area 300A, displays the parameter setting screen at the bottom of the editing screen 400A, and sets detailed parameters. The parameter setting of the image capture icon 252 (command SNAP) includes the following setting items.
   Exposure time
   Whether or not the LED lighting is on
   Image reduction rate The following setting items are set in the parameter setting of the detection icon 253 (command FIND_SHAPE or FIND_BLOB). In the following setting items, the "matching threshold" and the "contrast threshold" are parameters related to thresholds in the image processing for object detection.
   Image to be used (image by SNAP1 or image by SNAP2)
   Shape to be found
   Matching threshold
   Contrast threshold In the correction calculation icon 254 (command CALC_OFFSET), for example, the position of the object in the image is obtained based on the detection results of the two detection icons 253 (command FIND_SHAPE and FIND_BLOB), and by converting the position in the image into three-dimensional coordinates in the robot coordinate system, an offset amount for correcting the teaching position of the robot is obtained.

Figure 7:
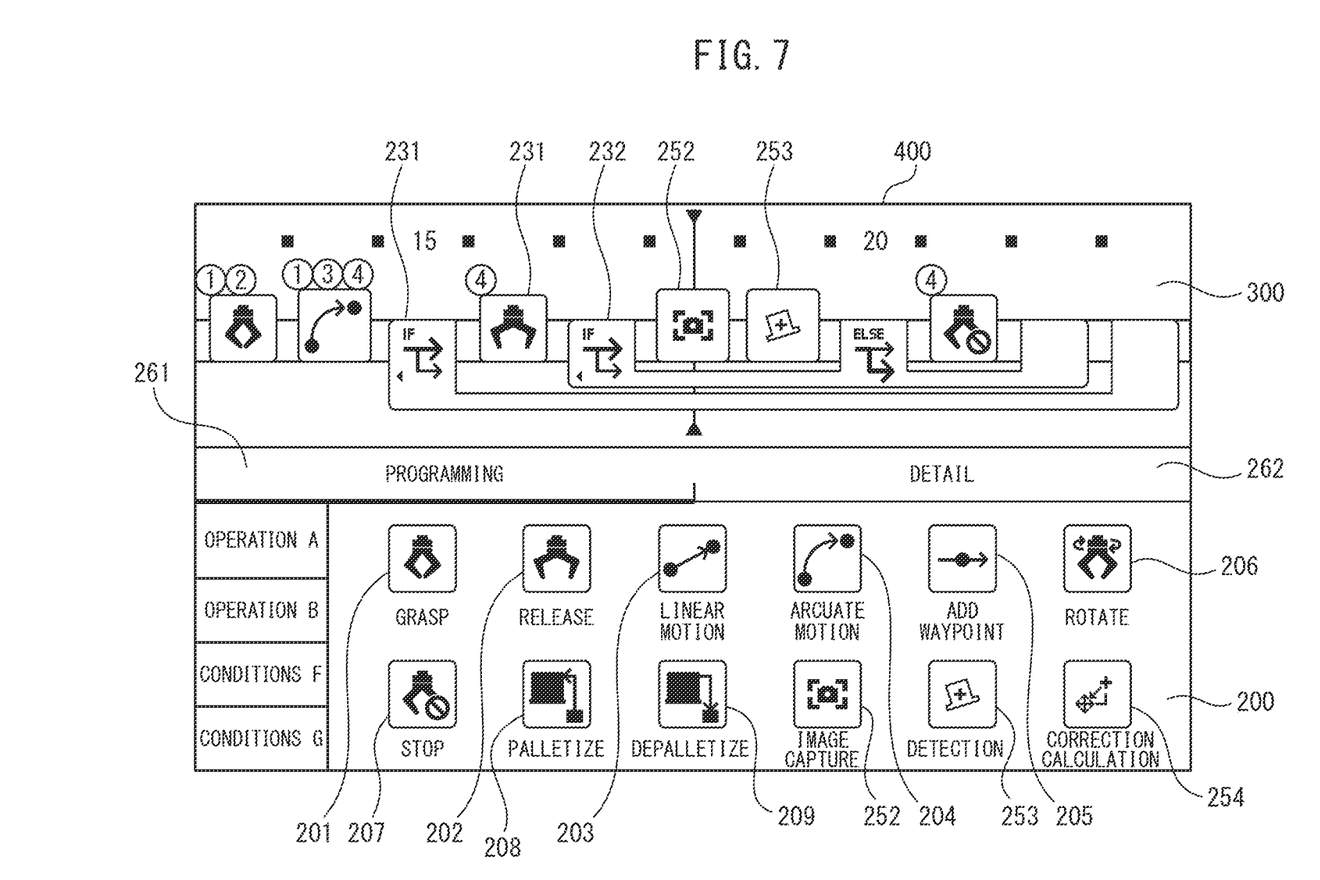
FIG. 7 is an example of an editing screen when a robot control program and a vision detection program are created in the same program creation area.

FIG. 7 is an example of a screen in the case not where a vision program is created on a separate screen, as in FIG. 6, but rather it is created on the editing screen 400 for creating the robot program shown in FIG. 3. In the editing screen 400 in this case, the icon display area 200 includes an image capture icon 252, detection icon 253, and correction calculation icon 254 for the vision program. When the vision program is included in the motion program, the operator can click a desired icon from the icons listed in the icon display area 200 and place it in the program creation area 300 by a drag-and-drop operation.

In the example of the motion program of the program creation area 300 in FIG. 7, the image capture icons 252 and the detection icon 253 are arranged.

An example of a vision program created in the program creation area 300 or 300A will be described below with reference to FIGS. 8 to 10.

Figure 8:
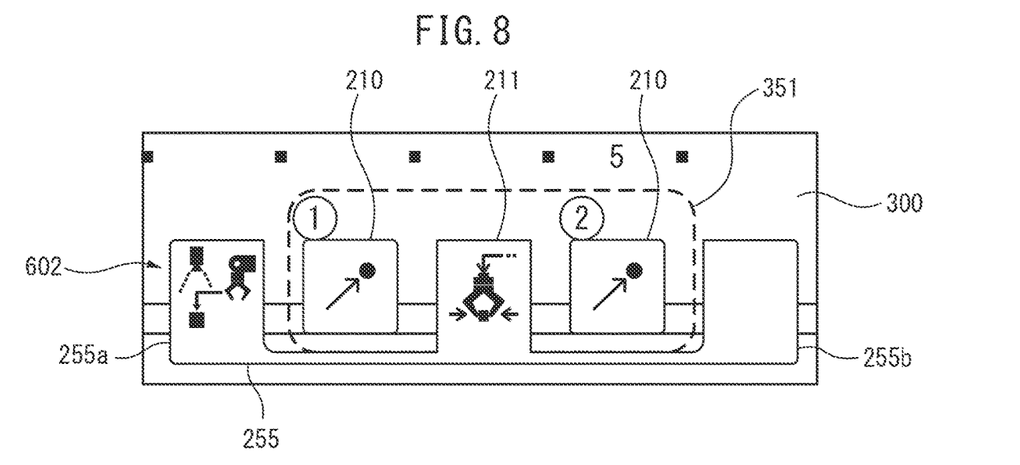
FIG. 8 is a view showing a first example of a vision detection program.

The vision program 602 of FIG. 8 includes an auxiliary icon 255 which represents a function corresponding to the "view and pick up" icon 251 described above and has a concave frame shape so as to be able to surround other icons. In the example of FIG. 8, the auxiliary icon 255 includes, between the ends 255a, 255b of the concave frame shape, icon 210 for instructing linear movement, icon 211 representing a command to grasp the object, and icon 210 for instructing linear movement.

In the vision program 602, the vision correction is applied in the two linear movement commands. In the vision program 602, for example, there are a plurality of objects in the field of view (captured image) of the visual sensor, and an operation for picking up the plurality of objects found in the captured image in order while applying vision correction is realized.

In the vision program 602 of FIG. 8, by selecting the auxiliary icon 255 and selecting the detail tab 262 shown in FIG. 3, etc., the program editing screen for creating the vision program as illustrated in FIG. 6 can be displayed.

Figure 9:
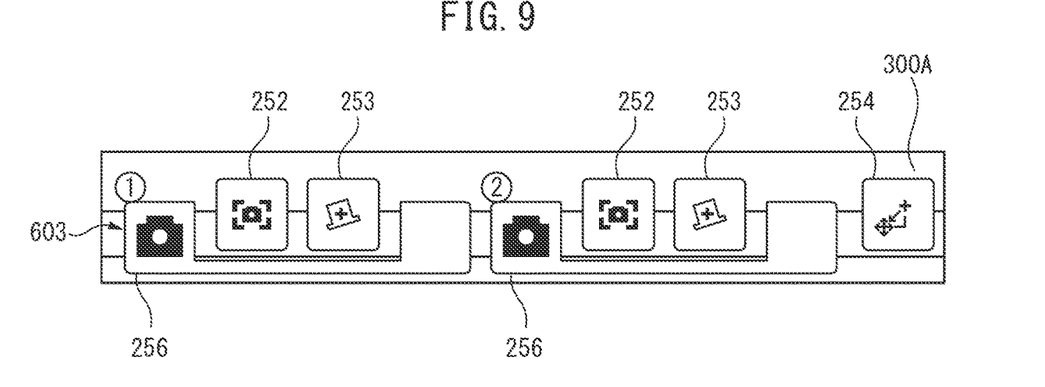
FIG. 9 is a view showing a second example of a vision detection program.

In the vision program 603 of FIG. 9, two program sets including the image capture icons 252 and the detection icons 253 between the concave frames of the auxiliary icons 256 representing a drawing of the camera are arranged side-by-side. A correction calculation icon 254 is arranged at the endmost part. The vision program 603 of FIG. 9 realizes the following operations. It is assumed herein that the robot system comprises two cameras.

(A1) The first camera detects one end of the object (auxiliary icon 256 on the left side in FIG. 9).

(A2) The second camera detects the other end of the object (auxiliary icon 256 on the right side in FIG. 9).

(A3) In the correction calculation icon 254, the position of the midpoint of the object is obtained from each of the detected positions, this position is set as the position of the object, and the position of the object in the robot coordinate system is obtained. As a result, the position where the teaching point should be corrected is obtained.

In the vision program 603 of FIG. 9, the icon group indicated by the auxiliary icon 256 on the left side of the drawing represents operations by the first camera, and the icon group indicated by the auxiliary icon 256 on the right side of the drawing represents the operations by the second camera. In the vision program 603, the operator includes a command to activate the first camera in the parameter setting screen to be called by selecting the auxiliary icon 256 on the left side of the drawing and selecting the detail tab 262. Furthermore, the operator includes a command to activate the second camera in the parameter setting screen to be called by selecting the auxiliary icon 256 on the right side of the figure and selecting the detail tab 262.

Figure 10:
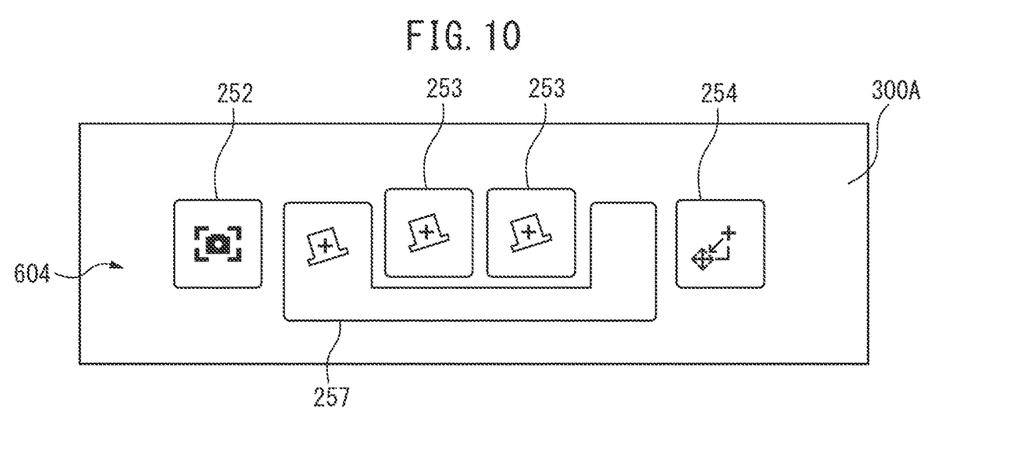
FIG. 10 is a view showing a third example of a vision detection program.

In the vision program 604 of FIG. 10, the image capture icon 252 is first arranged, then the auxiliary icon 257 corresponding to the detection operation is arranged, and the two detection icons 253 are arranged within the frame of the auxiliary icon 257. The vision program 604 realizes the following operations. First, an object is imaged by the image capture icon 252. Next, the detection auxiliary icon 257 detects the entire shape of the object, and the two detection icons in the auxiliary icon 257 detect features (for example, holes) on the object. As a result, an object having two holes can be detected. Next, the coordinates in the robot coordinate system of the object are obtained by the correction calculation icon 254 and used as data for position correction.

In the present embodiment as described above, the first type of icons for robot programming and the second type of icons for the vision program are similarly listed in the icon display area in the editing screen. Furthermore, in the present embodiment, the operation of arranging the icons of the vision program in the program creation area can be performed by the same operations as the operation of arranging the robot programming icons in the program creation area.

Specifically, according to the present embodiment, a motion program can be created by editing the first type of icons and the second type of icons with a common editing operation. Thus, according to the present embodiment, even an operator who is accustomed to robot programs but who is not accustomed to vision programs can create the vision program without difficulty.

Though typical embodiments have been used above to describe the present invention, a person skilled in the art would understand that changes and other various modifications, omissions, and additions can be made to the embodiments described above without deviating from the scope of the present invention.

In the embodiments described above, configuration examples in which the display method and operation method of the icons were standardized when the operation commands of the robot and the operation commands of the processing of images by the visual sensor were expressed as icons were described. In the creation of motion programs, the method of standardizing the command display method and input operation method in robot control programming and vision programming can also be realized by text-based programming.

As an example, it is assumed that the following text-based motion program (hereinafter referred to as motion program F) is input using the program editing device. In the program list below, the leftmost number on each line is the line number. In motion program F, the object is detected from the image captured by the first camera (camera A), the object is handled while correcting the position of the robot (line numbers 1 to 10), and next, the object is detected from the image captured by the second camera (camera B), and the object is handled while correcting the position of the robot (line numbers 12 to 19).

(Motion Program F)

1: linear position[1] 2000 mm/sec positioning;
2: ;
3: vision detection 'A';
4: vision correction data acquisition 'A' vision register[1] jump label[100];
5: ;
6: !Handling;
7: linear position[2] 2000 mm/sec smooth100 vision correction, vision register[1] tool correction, position register[1];
8: linear position[2] 500 mm/sec positioning vision correction, vision register[1];
9: call HAND_CLOSE;
10: linear position[2] 2000 mm/sec smooth100 vision correction, vision register[1] tool correction, position register[1];
11: ;
12: vision detection 'B';
13: vision correction data acquisition 'B' vision register[2] jump label[100];
14: ;
15: !Handling;
16: linear position[2] 2000 mm/sec smooth100 vision correction, vision register[2] tool correction, position register[1];
17: linear position[2] 500 mm/sec positioning vision correction, vision register[2];
18: call HAND_CLOSE;
19: linear position[2] 2000 mm/sec smooth100 vision correction, vision register[1] tool correction, position register[1];
20:

In motion program F above, the commands "linear position[ ]" and "call HAND_CLOSE" are commands belonging to robot control. Specifically, the command "linear position[

]" is a command to move the tip of the arm of the robot, and the command "call HAND_CLOSE" is a command to call the process for closing the hand. In motion program F, the commands "vision detection" and "vision correction data acquisition" are commands belonging to the vision program. Specifically, the command "vision detection" is a command for capturing an image with a camera, and the command "vision correction data acquisition" is a command for detecting an object and determining the position for correction.

The program editing device displays a list of instructions, for example, in a pop-up menu on the editing screen where the instructions of the motion program F are input. The pop-up menu includes, for example, a list of instructions as shown in Table 1 below.

TABLE 1

| No. | Instruction |
| --- | --- |
| 1 | Linear position[ ] |
| 2 | Call HAND_OPEN |
| 3 | Call HAND_CLOSE |
| 4 | Vision detection |
| 5 | Vision correction data acquisition |

The program editing device displays the instruction pop-up menu when the operation to display the instruction pop-up menu is performed. The program editing device then inserts the instruction in the pop-up menu selected by the selection operation (mouse click, touch operation on the touch panel) using the input device into the line where the cursor is present in the editing screen. The operator repeats the operation of selecting and inserting instructions to create the motion program F.

Even in the creation and editing of such text-based motion programs, instructions regarding robot control and instructions of the vision program are displayed by the same display method, and the operator can insert the instructions of the vision program into the motion program by the same operation method as selecting the instructions of the robot control and inserting them into the program. Thus, even in the case of such a configuration, the same effect as in the case of programming using icons in the embodiments described above can be achieved.

In the embodiments described above, as a specific example of realizing a predetermined function by capturing an image with a visual sensor and processing the captured image, an example of detecting the position of an object and using the detected position for correcting the operation of the robot has been described. In addition to the above examples, the functions realized by capturing an image with a visual sensor and processing the captured image include various functions, such as inspection and barcode reading, that can be realized by using a visual sensor.

For example, the case in which the robot system 100 of FIG. 1 is configured as a system for performing inspection (visual inspection, etc.) using the visual sensor 41 will be assumed. In this case, an icon representing the inspection function is displayed in the icon display area 200 of the editing screen 400 as shown in FIG. 3. The icon in this case can be any of a variety of figures reminiscent of inspection (for example, a design of the state in which an object is photographed with a camera), or alternatively, a figure with the description "inspection" added thereto can be used. In this case, settings of the camera used for imaging, information regarding the inspection target, pass/fail judgment criteria, etc. can be set on the detailed program creation screen or parameter setting screen for the inspection function icon. The test results are provided to the robot controller 50.

When the function of reading a barcode using the visual sensor 41 is added to the robot system 10 of FIG. 1, an icon representing the barcode reading function is displayed in the icon display area 200 of the editing screen 400 as shown in FIG. 3. In this case, the icon may be any of various figures reminiscent of the barcode reading function (for example, a figure including a camera and a barcode), or a figure with the description "read barcode" added thereto can be used. The barcode reading function may be realized, for example, by searching for and decoding a barcode by image processing from an image captured by a visual sensor. In this case, camera settings and the image processing related to the barcode reading can be set on the detailed program creation screen and parameter setting screen for the barcode reading function icon.

REFERENCE SIGNS LIST 10 program editing device
11 program editing unit
12 editing screen display unit
13 operation input reception unit
14 program generation unit
18 input device
19 display device
30 robot
31 hand
40 visual sensor controller
41 visual sensor
50 robot controller
100 robot system
200, 200A icon display area
300, 300A program creation area
400, 400A editing screen

The invention claimed is:
1. A device for editing a motion program of a robot, the device comprising:
at least one processor configured to:
obtain an editing operation on a first type of icons corresponding to commands related to control of the robot and a second type of icons corresponding to commands related to imaging with a visual sensor and processing of captured images; and
generate the motion program in accordance with the edited first type of icons and second type of icons,
wherein the at least one processor is further configured to:
display a program creation area for generating at control program of the robot by arranging the first type of icons;
obtain an operation input for arranging the second type of icons in the program creation area; and
generate the motion program in accordance with the first type of icons and the second type of icons arranged in the program creation area,
wherein the at least one processor is further configured to:
display an icon display area for displaying a list of the first type of icons and the second type of icons which can be used for programming, and
obtain an operation input for selecting the first type of icons and the second type of icons from the icon display area and arranging the selected first type of icons and second type of icons in the program creation area.

2. A device for editing a motion program of a robot, the device comprising:
at least one processor configured to:
obtain an editing operation on a first type of icons corresponding to commands related to control of the robot and a second type of icons corresponding to commands related to imaging with a visual sensor and processing of captured images; and
generate the motion program in accordance with the edited first type of icons and second type of icons,
wherein the at least one processor is further configured to:
display a first program creation area for generating a control program of the robot by arranging the first type of icons;
obtain an operation input for arranging the first type of icons in the first program creation area;
display a second program creation area for generating a program related to imaging with the visual sensor and processing of captured images by arranging the second type of icons; and
generate the control program of the robot in accordance with the first type of icons arranged in the first program creation area and generate a program related to imaging with the visual sensor and processing of captured images in accordance with the second type of icons arranged in the second program creation area,
wherein the at least one processor is further configured to:
display a first icon display area for displaying a list of the first type of icons which can be used for programming and a second icon display area for displaying a list of the second type of icons which can be used for programming, and
obtain an operation input for selecting the first type of icons from the first icon display area and arranging the selected first type of icons in the first program creation area, and obtain an operation input for selecting the second type of icons from the second icon display area and arranging the selected second type of icons in the second program creation area.

3. A device for editing a motion program of a robot, the device comprising:
at least one processor configured to:
obtain an editing operation on a first type of icons corresponding to commands related to control of the robot and a second type of icons corresponding to commands related to imaging with a visual sensor and processing of captured images; and
generate the motion program in accordance with the edited first type of icons and second type of icons,
wherein the second type of icons include an icon having a command for correcting position information described in the first type of icon.

4. The device according to claim 3, wherein the second type of icons include an image capture icon, a detection icon, and a correction calculating icon.

5. The device according to claim 3, wherein the at least one processor is further configured to:
display a program creation area for generating a control program of the robot by arranging the first type of icons;
obtain an operation input for arranging the first type of icons in the program creation area;
obtain an operation input for arranging the second type of icons in the program creation area; and
generate the motion program in accordance with the first type of icons and the second type of icons arranged in the program creation area.

6. The device according to claim 5, wherein the at least one processor is further configured to:
display an icon display area for displaying a list of the first type of icons and the second type of icons which can be used for programming; and
obtain an operation input for selecting the first type of icons and the second type of icons from the icon display area and arranging the selected first type of icons and second type of icons in the program creation area.

7. The device according to claim 3, wherein the at least one processor is further configured to:
display a first program creation area for generating a control program of the robot by arranging the first type of icons;
obtain an operation input for arranging the first type of icons in the first program creation area;
display a second program creation area for generating a program related to imaging with the visual sensor and processing of captured images by arranging the second type of icons; and
generate the control program of the robot in accordance with the first type of icons arranged in the first program creation area and generate a program related to imaging with the visual sensor and processing of capture images in accordance with the second type of icons arranged in the second program creation area.

8. The device according to claim 7, wherein the at least one processor is further configured to:
display a first icon display area for displaying a list of the first type of icons which can be used for programming and a second icon display area for displaying a list of the second type of icons which can be used for programming; and
obtain an operation input for selecting the first type of icons from the first icon display area and arranging the selected first type of icons in the first program creation area, and obtain an operation input for selecting the second type of icons from the second icon display area and arranging the selected second type of icons in the second program creation area.

* * * * *